United States Patent
Beentjes et al.

(10) Patent No.: US 8,382,034 B2
(45) Date of Patent: Feb. 26, 2013

(54) SYSTEM BOX FOR ACCOMMODATING AIRCRAFT SYSTEMS

(75) Inventors: Gijsbertus Beentjes, Harsefeld (DE); Holger Warner, Jork (DE); Christian Wesselink, Hamburg (DE)

(73) Assignee: Airbus Operations GmbH (DE)

( * ) Notice: Subject to any disclaimer, the term of this patent is extended or adjusted under 35 U.S.C. 154(b) by 455 days.

(21) Appl. No.: 12/317,213

(22) Filed: Dec. 18, 2008

(65) Prior Publication Data

US 2009/0159744 A1 Jun. 25, 2009

Related U.S. Application Data

(60) Provisional application No. 61/008,743, filed on Dec. 21, 2007.

(30) Foreign Application Priority Data

Dec. 21, 2007 (DE) .......................... 10 2007 062 194

(51) Int. Cl.
*B64C 1/10* (2006.01)
(52) U.S. Cl. .................................. 244/118.5; 244/118.1
(58) Field of Classification Search ............. 244/117 R, 244/118.1, 118.5, 129.1
See application file for complete search history.

(56) References Cited

U.S. PATENT DOCUMENTS

| 3,330,506 | A | * | 7/1967 | Robillard et al. | 244/118.5 |
|---|---|---|---|---|---|
| 4,022,404 | A | * | 5/1977 | Greiss | 244/118.5 |
| 4,066,227 | A | * | 1/1978 | Buchsel | 244/118.6 |
| 5,083,727 | A | * | 1/1992 | Pompei et al. | 244/118.6 |
| 5,716,027 | A | * | 2/1998 | Hart et al. | 244/118.1 |
| 6,003,813 | A | * | 12/1999 | Wentland et al. | 244/118.5 |
| 6,182,926 | B1 | * | 2/2001 | Moore | 244/118.5 |
| 6,464,169 | B1 | * | 10/2002 | Johnson et al. | 244/118.5 |
| 6,536,710 | B1 | * | 3/2003 | Bobzien et al. | 244/119 |
| 6,848,653 | B2 | * | 2/2005 | Finke et al. | 244/118.5 |
| 7,461,816 | B2 | * | 12/2008 | Schwartz et al. | 244/117 R |
| 7,469,860 | B2 | * | 12/2008 | Young et al. | 244/118.5 |
| 2005/0135093 | A1 | * | 6/2005 | Alexanderson et al. | 362/227 |
| 2005/0236523 | A1 | | 10/2005 | Schwartz et al. | |
| 2006/0237585 | A1 | * | 10/2006 | Lau et al. | 244/118.5 |
| 2009/0026318 | A1 | * | 1/2009 | Gross et al. | 244/131 |

FOREIGN PATENT DOCUMENTS

EP 0311771 4/1989

* cited by examiner

*Primary Examiner* — Peter R. Brown
(74) *Attorney, Agent, or Firm* — Lerner, David, Littenberg, Krumholz & Mentlik, LLP

(57) ABSTRACT

A system box for accommodating aircraft systems, and for load transmission between an aircraft structure and a crew rest compartment. The system box comprises a first, a second and a third region, wherein the three regions differ from each other. The first region is adapted attachment of the system box to the primary structure of the aircraft, wherein the second region is adapted for mechanical contact with a crew rest compartment for the aircrew. The mechanical contact in turn is adapted for load transmission between the aircraft structure and the crew rest compartment. Necessary aircraft systems are accommodated in the third region of the system box.

11 Claims, 5 Drawing Sheets

SYSTEM BOX FOR ACCOMMODATING AIRCRAFT SYSTEMS

CROSS-REFERENCE TO RELATED APPLICATIONS

This application claims the benefit of the filing date of U.S. Provisional Patent Application No. 61/008,743 filed Dec. 21, 2007, the disclosure of which is hereby incorporated herein by reference.

BACKGROUND OF THE INVENTION

The present invention relates to the integration of aircraft systems. In particular, the invention relates to a system box for accommodating aircraft systems, to a modular kit comprising such system boxes, to the use of a system box in an aircraft, and to an aircraft comprising such a system box.

Accommodation compartments for crewmembers of an aircraft (crew), also called crew rest compartments (CRCs), form part of the prescribed facilities of aircraft in the case of long-duration flights. For example, according to international standards one berth for the flight crew (pilots) is required for flights of a duration of between 8 and 14 hours, and two births for flights exceeding 14 hours.

Such rest zones for the flight crew of long-range commercial aircraft can be arranged above the cabin, i.e. in the ceiling area, as overhead crew rest compartments. This region is often described as the crown area of the aircraft. In order to ensure installation of these rest zones, it is necessary, in aircraft, to provide systems such as for example the electrics, oxygen supply and air-conditioning such that minimum clearances between different systems can be observed. Furthermore, a holder for the structural connection of the crew rest compartment must be provided, as must the integration and structural connection of the systems in the upper part of the fuselage.

Known techniques for connecting the crew rest compartment to the aircraft structure, which hereafter is also designated the primary structure, comprise the installation of various supports and tie rods and corresponding connection elements. The development, design, construction and installation of these structures is correspondingly complex. Further integration of aircraft systems, for example electrics or air conditioning, is correspondingly difficult because time and again braces extend transversely to the normal system paths. This also means that a modular combination of crew rest compartments or of various systems comprising crew rest compartments is associated with considerable expenditure in time and work. This solution is also not optimal from the point of view of weight.

BRIEF SUMMARY OF THE INVENTION

The exemplary embodiments and details described below apply equally to the system box, the modular kit, the use of a system box, and the aircraft comprising a system box.

According to an exemplary embodiment of the present invention, a system box for accommodating aircraft systems is stated, wherein the system box comprises a first, a second and a third region. In this arrangement the three regions are designed differently from each other, and the first region is designed for attachment of the system box to an aircraft structure. Furthermore, the second region is designed for mechanical contact with a crew rest compartment (or accommodation compartment) for an aircrew, wherein the mechanical contact is designed for load transmission between the aircraft structure and the crew rest compartment. In contrast to this, the third region is designed to accommodate aircraft systems.

In this arrangement the system box acts as a secondary structure for the crew rest compartment within the aircraft fuselage. In contrast to this, the aircraft structure is designated a primary structure.

In this arrangement, the term aircraft system refers to the electrics, the oxygen supply, the air conditioning system and all further supply systems within the aircraft. These systems can be integrated in the system box according to the invention so that the system box, which is also designated torsion box or integrated system attachment box, can be installed. This box thus functions as a support for the aircraft systems. This accommodation of the systems in the torsion box takes place in the third region, according to the invention, of the box.

Within the first region of the system box there are all the devices and individual components that are necessary for attachment and mechanical fixing of the system box to the aircraft structure. These can, for example, include holes for screwing the system box to the primary structure of the aircraft, or recesses for volumes of adhesive that ensure attachment and mounting of the system box to the aircraft. Furthermore, any other attachment option, e.g. riveting, is possible in the first region of the system box.

In this arrangement in the attachment means selected it may have to be ensured that not only the intrinsic weight of the system box can be carried by the attachment means, but that also any subsequent additional load that is to be affixed to the system box can be accommodated or held by the attachment means in the first region.

The second region, which is designed to establish mechanical contact with a crew rest compartment for the aircrew, can, for example, may make possible optimum space-saving use of the ceiling volume on the sides of a crew rest compartment. For example, if the system box, as far as its external dimensions and its external shape are concerned, is adapted so that it sits closely against the crew rest compartment, waste of space can be prevented, and a reduction in the weight of the ceiling region or of the system box can be ensured. This is, for example, clearly evident from FIG. 2.

However, a bearing arrangement or placement of the crew rest compartment on the second region of the system box may become possible in this arrangement. In this way mechanical support for the load of the contacting monument may be ensured by the second region. This, too, is clearly evident from FIG. 2.

The mechanical contact is furthermore designed for load transmission between the aircraft structure and the crew rest compartment. In other words this means that the entire weight of the crew rest compartment can be introduced through the second region into the system box and from the system box onwards to the aircraft structure. In this process the system box does not suffer any damage.

In this arrangement the second region can, for example, fully accept mechanical affixation of the crew rest compartment within the aircraft fuselage. Any mechanical attachment means such as screws, rivets, pins, gluing together and snap-and-click closures, as well as corresponding recesses, that are necessary can be provided in the second region.

In this arrangement, in the design of such attachment in the second region it can, in particular, be ensured that possible inertia movements of the affixed load (e.g. the affixed crew rest compartment) can occur in longitudinal direction of the aircraft.

Both the mechanical contact and the attachment of the system box to the aircraft structure are adapted to cope with these loads with the crew rest compartment affixed.

This integrated system comprising a box for accommodating aircraft systems and supply systems on the one hand, and for accommodating a mounting device for load transmission from the aircraft structure to the crew rest compartment and vice versa on the other hand, provides manifold advantages. Since the system box not only serves the function of load transmission but also the function of a support for the aircraft systems, this results in a significant saving of space. There is no need to use separate cable guide rails and the mounting device required for these. The minimum distances that are necessary between the various routes of different or identical systems can be minimised. Furthermore, no additional design space for the holder and the tie rod of the crew rest compartment is required.

Furthermore, the aircraft—and supply systems integrated in the system box are provided with inherent and immanent mechanical protection so that a further weight component for mechanical protection of the line can be saved, which mechanical protection would otherwise have to be affixed in addition.

In this arrangement the term crew rest compartment can refer to any type of crew rest or flight crew rest compartment that is, for example, affixed above the cabin in the ceiling region, i.e. in the crown area.

It may be an important advantage of the invention that stiffening of the CRC can be optimised, i.e. designed so as to be of a more lightweight nature, because a large component of load transmission is handled by the system box.

Since the system box as a secondary structure provides load relief to the primary structure, in this area further weight advantages in the primary structure can be achieved. Likewise, further space in the crown area may be saved. Thus, weight saving in the entire aircraft may be achieved. Moreover, time savings in the production and installation process of the cabin and of the entire aircraft are important advantages of the invention.

In this arrangement, in further future developments, the system box can comprise still further regions.

According to a further exemplary embodiment of the present invention the second region is designed for the structural connection of a crew rest compartment to the system box.

Since the system box, also known as an integrated system attachment box, box or support, acts as a secondary structure within the aircraft, connection of a crew rest compartment entirely by means of the second region of the system box is possible. This can mean that the entire weight and all the tension loads, compression loads and inertia loads that arise as a result of the connected monument or the connected crew rest compartment can be absorbed by the second region. Thus, no further attachment means for the crew rest compartment are necessary. As shown, for example, in FIG. 2, this second region can be designed as a horizontal bearing surface onto which the crew rest compartment can be placed, and to which horizontal bearing surface said crew rest compartment can subsequently be attached. In this arrangement a further vertical contact surface between the two objects can arise. This can lead to further stowage space being created.

According to a further exemplary embodiment of the present invention the system box comprises a single component.

The above is, for example, a cast component. This design, according to the invention, of the system box makes it possible for said system box to be implemented as an independent component that can be constructed and built in advance, and thereafter can be integrated very flexibly in the production process of a cabin. This can, for example, happen in the structure equipment phase.

This embodiment obviates the need for various further components such as supports, pipes and connecting elements for connecting a crew rest compartment. Likewise, further integration of aircraft systems is ensured in a particularly simple manner as a result of the one-piece design of the system box. It is thus no longer absolutely necessary to modify and expand transverse braces, for example in the case of changes in aircraft systems.

In this arrangement it is possible that the system box comprises several individual components, which are, however, integrated to form a single component of the system box prior to installation in the aircraft. At the point in time of the structure equipment phase the system box is thus present as a self-sufficiently functioning independent component. It is then only necessary to attach the box to the primary structure with corresponding attachment means as desired.

In this arrangement the system box can be produced with the use of a wide range of materials and production processes. It is thus possible, for example, to cast, mill, screw together, glue together, rivet together and/or plug together several elements to form the system box.

According to a further exemplary embodiment of the present invention, the third region is divided into various segments.

In this arrangement the box or the system box furthermore is characterised in that it is divided into several compartments. These compartments are provided for installation of the various aircraft systems. Consequently, these aircraft systems and supply systems are very easily dividable from each other and spatially separable. In this way the system box, which can be regarded as an integrated system comprising the box and the mounting device, is designed so as to be structurally simple and more clearly laid out. In the individual compartments it is then possible, for example, to route cables or lines without there being any need to use extra cable guide rails and associated mounting devices. Since it is now possible to provide a compartment wall between various lines, the minimum distances that are necessary between the electrics and other systems may be reduced. Since the individual lines can be affixed to the compartment walls there is no need to provide additional design space for holders.

Likewise, the compartment walls or the mutual demarcations of the segments provide delimitations and mechanical protection vis-à-vis other lines and vis-à-vis external influences.

According to a further exemplary embodiment of the present invention, the division of the segments is designed such that various segments are electrically shielded from each other.

As a result of the installation of electrical lines in the box they are mechanically protected and electrically separated from each other and shielded. There is thus no mutual influencing. Additional insulation of the line can be done without, and in this way weight can be saved. Furthermore, the electrical lines can be electromagnetically shielded by the system box from external incident electromagnetic signals. In this arrangement the system box can be used as a Faraday cage. Corresponding material requirements for this are met.

According to a further exemplary embodiment of the present invention, the system box comprises at least one connecting element, wherein by means of the connecting element several system boxes can be interconnected.

In order to make possible a modular combination of various system boxes, connecting elements are provided that can interconnect several system boxes in a positive-locking and/or non-positive-locking manner. In this arrangement an extension in longitudinal direction of the aircraft can be made possible. In this arrangement any mechanical device that establishes an overall system comprising two system boxes can be used for the connection. It is, for example, possible to use a closing device according to the click-and-snap principle; however, firm affixation, for example by means of screwing, riveting or gluing together is also possible.

According to a further exemplary embodiment of the present invention, the third region is designed such that it provides mechanical protection for the aircraft systems.

In order to achieve further weight savings, and so as to avoid having to use a protective layer or a protective element for the aircraft systems, the individual segments of the system box are designed to protect the aircraft systems. In this arrangement the walls and edge boundaries of the individual volumes or of the individual segments can not only have a structuring effect, but also a protective effect.

According to a further exemplary embodiment of the present invention, the division is designed such that minimum clearances between different aircraft systems are reduced.

The above can refer both to minimum clearances that are necessary between electrical cable harnesses of various routes, and to minimum clearances that are necessary between the electrics and other systems. In this arrangement the presence of a segment wall between two different lines of different or identical aircraft systems can reduce the minimum clearance. This clearance of directly adjacent lines, which clearance would have to be considerably greater without a segment wall can be reduced by various divisions of the segments and thus by providing various partition walls. It is thus possible to achieve greater aircraft system density, which corresponds to urgently required stowage space in the cabinet region. This achieved increase in aircraft system density makes it possible to save weight, for example as a result of fewer mounting options. This significant argument is enormously important, in particular in times of urgently desired reduction in kerosene and emissions.

According to a further exemplary embodiment of the present invention, the aircraft systems are selected from the group comprising e.g. oxygen supply, air conditioning supply, electrical supply, lighting supply, water supply and waste water supply.

The option of differently integrating aircraft systems in one and the same system box or in one system comprising several such system boxes and concurrent structural connection of the crew rest compartment may result in a very flexible design space in the joining of various crew rest compartments depending on the desired cabin structure. For example, various set-ups of the cabin with different crew rest requirements may be quickly and flexibly combined by means of the system box according to the invention. In this arrangement said aircraft systems can easily be accommodated in the third region of the system box. The hitherto common braces that extend transversely to the normal system paths can be avoided by the system box according to the invention, which not only provides an optimum weight solution, but also reduces the costs for repairing the system box and the lines contained therein. Due to the absence of many transverse braces, the susceptibility to malfunction is clearly reduced by means of the system box.

By means of the system box according to the invention the complete system supply of an aircraft may thus be integrated in the system box, without this resulting in influences, disturbing signals or damaging effects between the electrics and other systems, or between electrical cable harnesses of various routes. Independent functioning of the individual lines is ensured in the segments of the third region of the system box.

According to a further exemplary embodiment of the present invention, a modular kit comprising at least two system boxes is stated.

In order to make possible flexible processing of the crew rest requirements during the manufacturing process of a cabin structure and during the fit-out of this cabin structure, a modular system box comprising various individual system boxes can be assembled from the kit. The above is, for example, achieved by means of the connecting element. In this arrangement the system boxes can, for example, differ in length in order to be able to meet the requirements of the specific aircraft, the specific structure or the specific monument or crew rest compartment.

This modularity may also ensure that the lines of the aircraft systems can be routed continuously along the entire kit.

An interruption of the line paths that are connected with additional holders and deflection elements can thus be excluded. This represents further weight savings.

If, for example, several system boxes are designed as one component, then by means of simple joining of the kits after subsequent or previous integration in the primary structure of the aircraft, a long channel or a long box can be created. Adjacent to this, a monument, for example a crew rest compartment, can be connected. In this way the dual function of load transmission and integration of the aircraft systems, which is provided by a system box, can be applied or implemented to an extended desired path along the longitudinal axis of the aircraft.

According to a further exemplary embodiment of the present invention, the use of a system box in an aircraft is stated.

According to a further exemplary embodiment of the present invention, an aircraft comprising a system box is stated.

Further exemplary embodiments and advantages of the invention are presented in the following description of the figures.

The illustrations in the figures are diagrammatic and not to scale.

DETAILED DESCRIPTION

Figure 1:
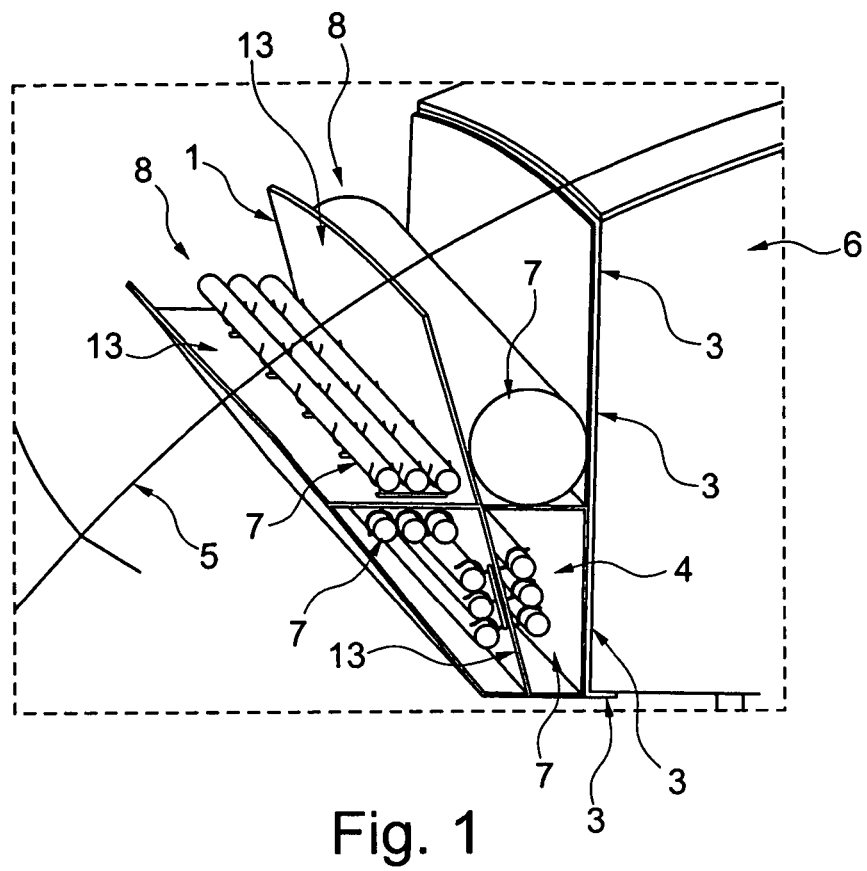
FIG. 1 shows a diagrammatic three-dimensional view of the system box according to an exemplary embodiment of the invention.

Below, exemplary embodiments of the present invention are described with reference to the figures.

In the following description of the figures the same reference characters are used for identical or similar elements.

Figure 4:
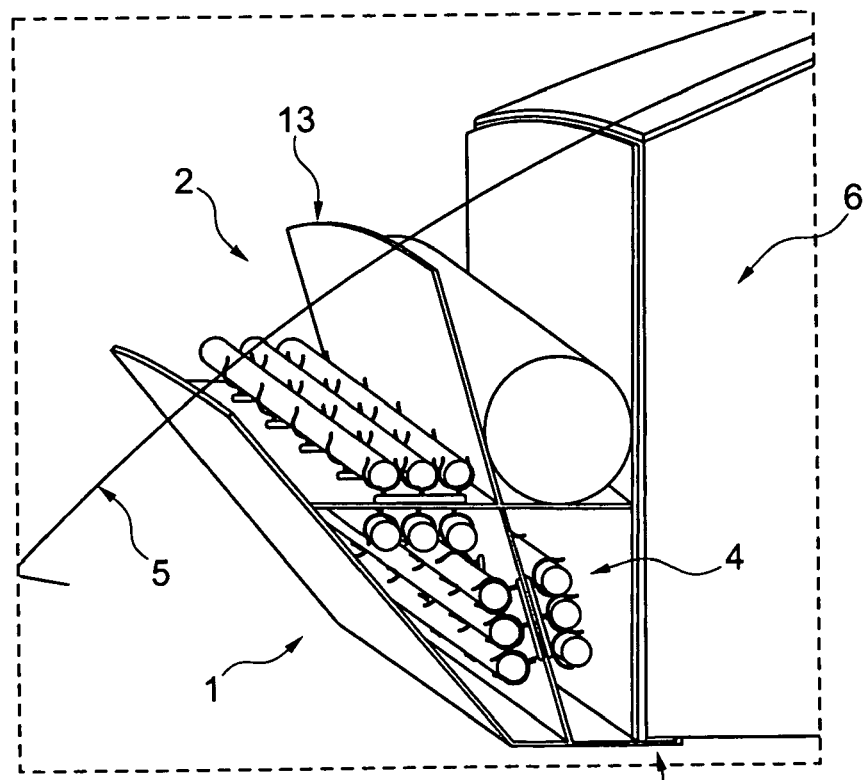
FIG. 4 shows a diagrammatic three-dimensional view of the system box according to an exemplary embodiment of the invention.

FIGS. 1 and 4 show a three-dimensional oblique view of an exemplary embodiment of the system box 1 according to the invention. In this arrangement the third region 4 is divided into different segments 8 in which various aircraft systems 7 are accommodated. The individual segments can be separated from each other by means of various segment walls 13. In this arrangement the minimum distance between different lines 7 can be reduced, for example, as a result of the existence of the segment walls. In the present embodiment the second region 3 is designed in a horizontal plane onto which the monument, for example in the present case the crew rest compartment 6, can be placed, or with which plane said monument can at least establish contact. In this arrangement load transmission between the aircraft structure 5 and the crew rest compartment 6 is ensured by the mechanical contact in the second region 3. In this way it is possible, for example, to cause the complete weight of the crew rest compartment 6 and any further occurring loads that are caused by the crew rest compartment 6 to be introduced into the aircraft structure 5 through the system box 1. The system box shown in the above figures thus serves as an integrated system accommodation device and as a mounting box.

In this arrangement the installation of such a torsion box can avoid a complex construction comprising supports and pipes, which construction comprises a host of components. Apart from considerable weight savings this results in a flexible adaptation option of the cabin structure to various requirements with regard to individual or to several crew rest compartments.

It is clearly evident that the system box 1 according to the invention, in particular the partition walls 13, provide the individual systems 7 with mechanical protection from the external environment and from other lines in other segments.

Figure 2:
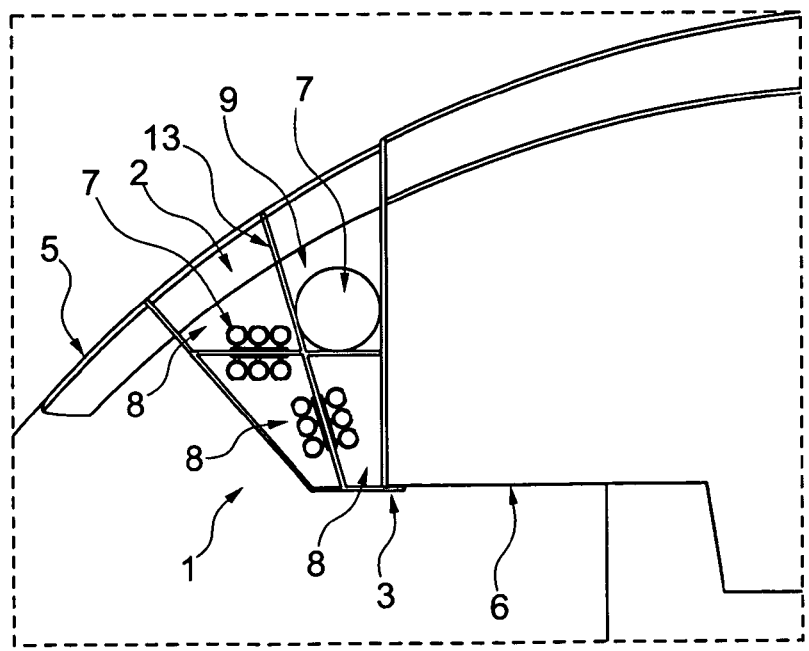
FIG. 2 shows a cross section of a diagrammatic two-dimensional view of the system box according to an exemplary embodiment of the invention.
Figure 3:
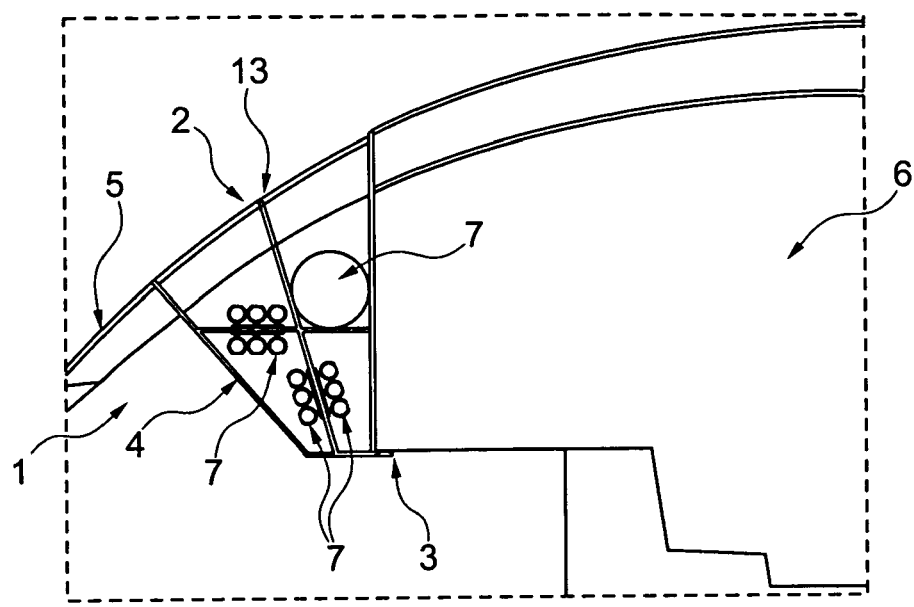
FIG. 3 shows a diagrammatic two-dimensional view of the system box according to an exemplary embodiment of the invention.

FIGS. 2 and 3 show a diagrammatic view of a cross section of a system box according to an exemplary embodiment of the invention. In this arrangement the system box is attached to the aircraft structure 5 by way of a first region 2. It is thus possible, solely as a result of the attachment of the system box, to provide, in the primary structure of the aircraft, both a secondary structure for the crew rest compartment 6 and a functionally integrated volume for accommodating aircraft systems 7. The diagrams clearly show that the various segments 8 provide separate volumes for the aircraft systems. For example, the partition walls 13 and the edge boundaries of the system box can serve as a Faraday cage so that the entire system box is electromagnetically shielded from the entire external environment. Furthermore, shielding of the individual segments from each other with regard to the various media of the respective systems, for example liquid, electrical current, electromagnetic radiation, light or air conditioning air, is ensured as a result of the division into segments. Moreover, the second region 3 is shown, in which the crew rest compartment shown establishes contact with the system box. In this arrangement both in the narrow horizontal bearing area of the system box and in the longer vertical region a fixed load and integral connection of the crew rest compartment can take place. In this arrangement the structural connection of the crew rest compartment to the system box ensures that all the forces that occur are introduced into the primary structure of the aircraft 5.

Figure 5:
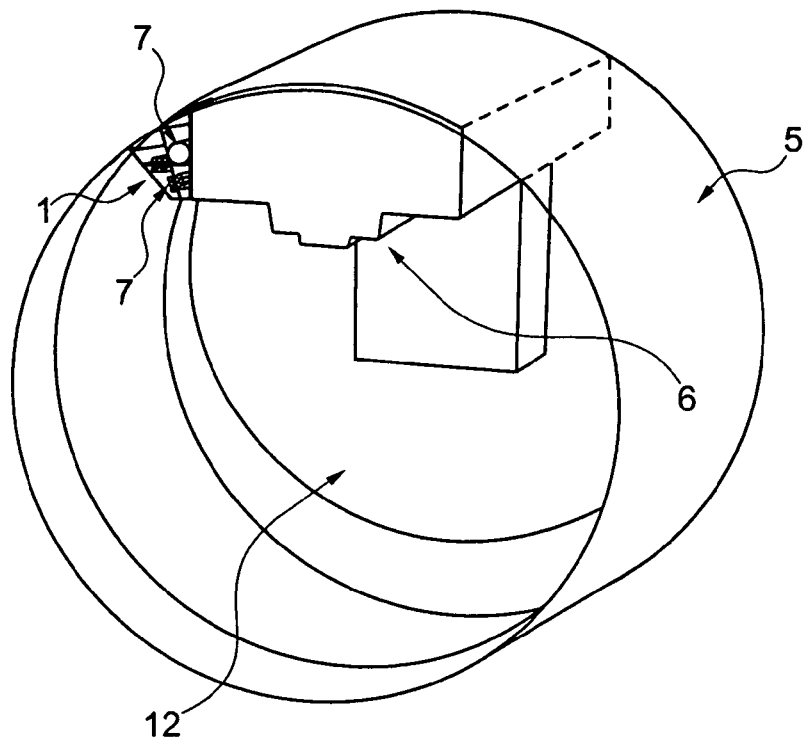
FIG. 5 shows a diagrammatic three-dimensional view of the system box in an aircraft structure according to an exemplary embodiment of the invention.

FIG. 5 shows an exemplary embodiment of the system box 1 according to an exemplary embodiment of the present invention. In this arrangement the system box is shown in an aircraft fuselage 5 wherein the system box 1 ensures and provides the structural connection of the crew rest compartment 6 to the aircraft structure 5. The diagram shows a cabin region 12 in whose crown area the rest area for the crew is to be created. As a result of both integrated accommodation of the aircraft systems 7 and the function as a secondary structure for the crew rest compartment, complex constructions of various supports, pipes and corresponding connecting elements can be prevented. A simple and above all modular use of the system boxes is used for flexible fit-out of the cabin during the structure fit-out process.

Figure 6:
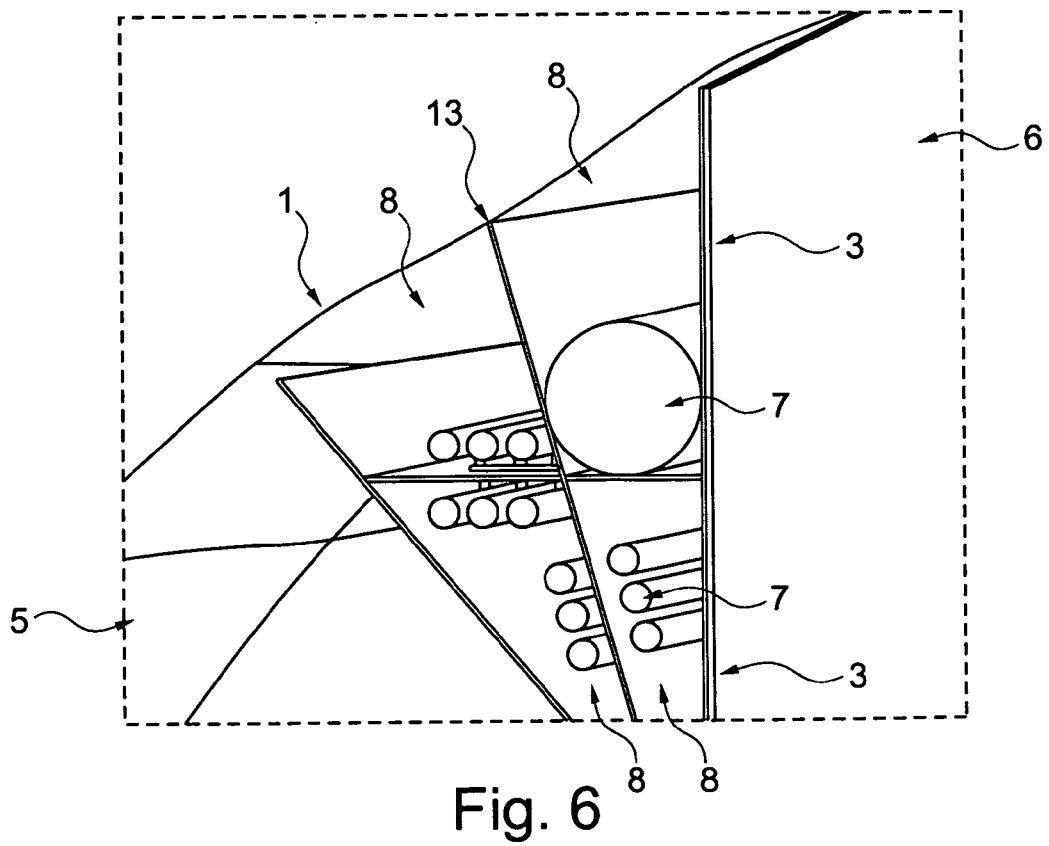
FIG. 6 shows a diagrammatic three-dimensional view of the system box according to an exemplary embodiment of the present invention.

FIG. 6 shows a diagrammatic three-dimensional view of a system box according to an exemplary embodiment of the invention. The diagram shows four different segments 8 within the box 1 that accommodate various lines 7. These can, for example, be water pipes, electrical lines, air pipes or light lines which according to applicable legal standards have to be arranged at different spacing from each other. As a result of these partition walls 13 these standards can, for example, be relaxed. This connection of the crew rest compartment 6 to the box is effected by way of the second region 3. In this arrangement the box 1 can, for example, be a single part component in order to simplify implementation and reconfiguration work.

Figure 7:
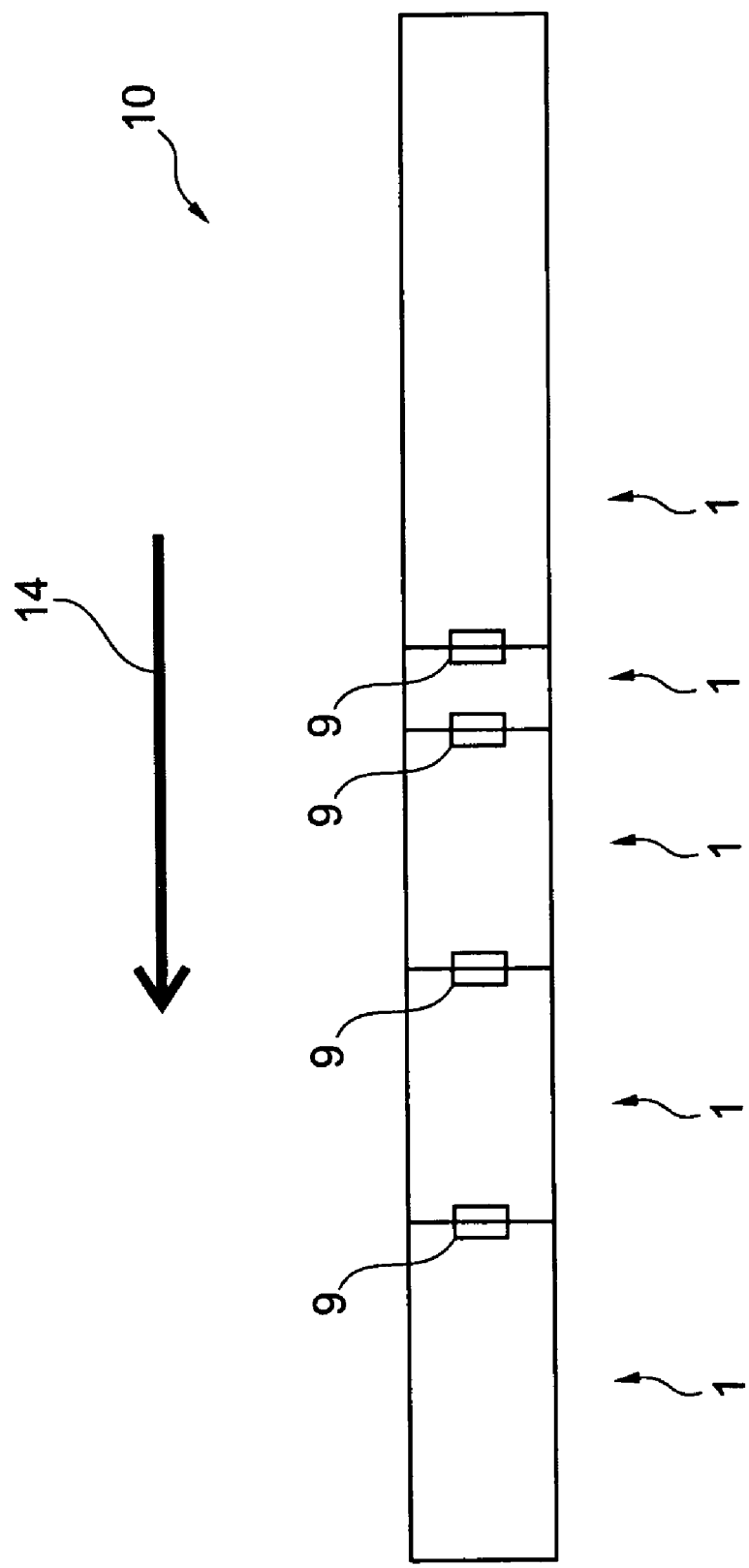
FIG. 7 shows a diagrammatic two-dimensional view of a modular kit comprising system boxes according to an exemplary embodiment of the invention.

FIG. 7 shows an exemplary embodiment of the modular kit according to the invention, comprising several system boxes. The diagram shows system boxes 1 that differ in length, which system boxes 1 can be combined with each other by means of respective connecting elements 9. This makes possible flexible length adjustment of the component to the actual requirements with regard to the crew rest compartment. In this arrangement the exemplary direction of flight of an aircraft in which such a kit can be installed is indicated with the reference character 14.

Figure 8:
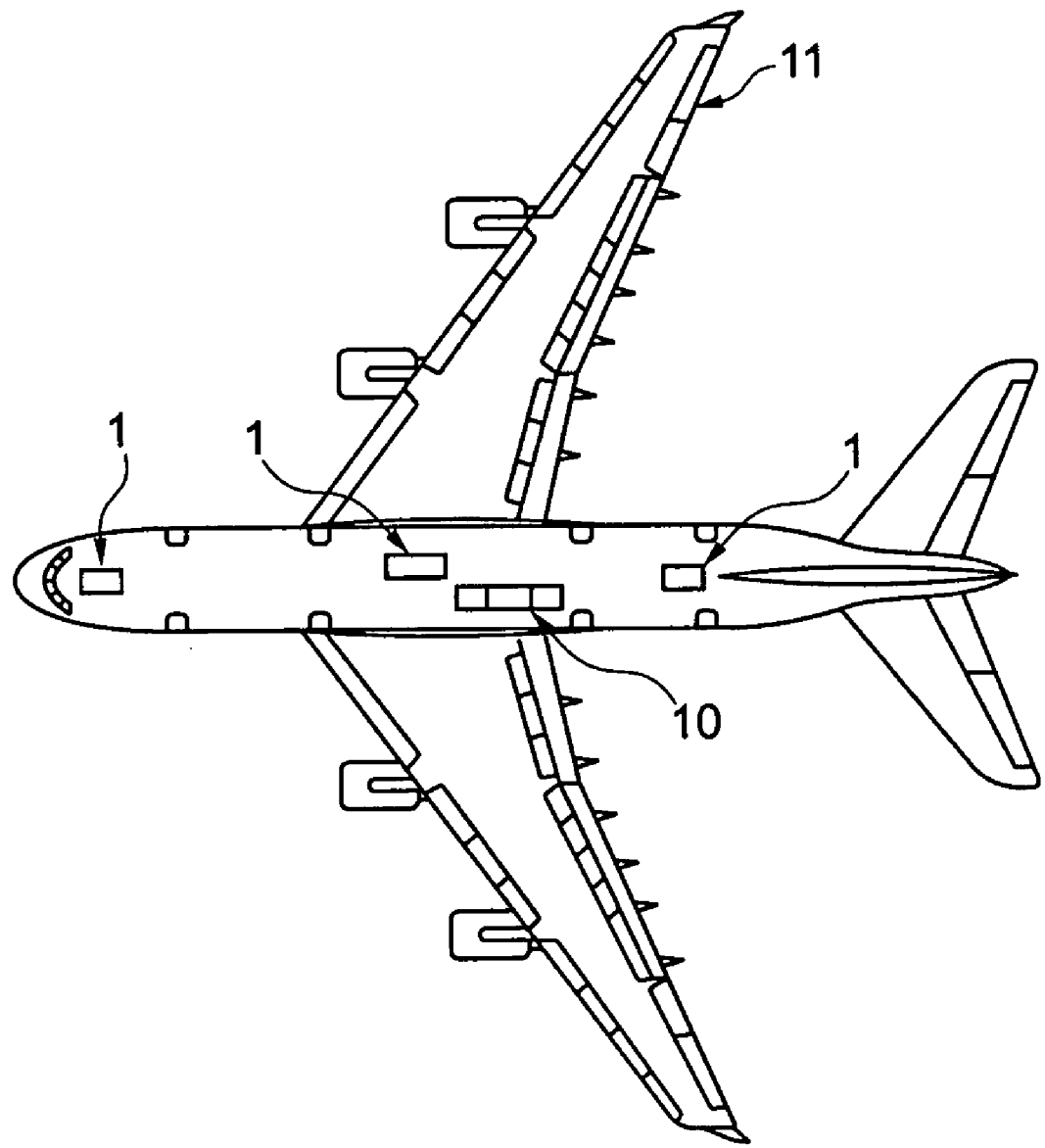
FIG. 8 shows a diagrammatic two-dimensional view of an aircraft comprising a system box according to an exemplary embodiment of the invention.

FIG. 8 shows an aircraft with a system box according to an exemplary embodiment of the invention. The diagram shows an aircraft 11 with various system boxes 1 and with a modular kit 10. In this arrangement both individual system boxes and a modular kit can be installed in all the longitudinal regions of the aircraft cabin. If the system box is, for example, equipped for affixing a flight crew rest compartment behind the cockpit, then this is possible as a result of the system box according to the invention.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 System box
2 First region
3 Second region
4 Third region
5 Aircraft structure
6 Crew rest compartment 7 Aircraft system
8 Segments
9 Connecting element
10 Modular kit
11 Aircraft
12 Cabin region
13 Segment wall
14 Direction of flight

The invention claimed is:

1. An aircraft comprising
a Crew Rest Compartment,
a system box, and
a plurality of aircraft systems,
wherein the system box is attached to the aircraft,
wherein the Crew Rest Compartment is attached to the system box, thereby being attached to the aircraft;
wherein the system box comprises at least a first segment in which the plurality of aircraft systems are accommodated; and
wherein the system box comprises an outwardly extending lip portion defining a substantially narrow and substantially horizontal bearing area;
wherein the system box further comprises a substantially large and substantially vertical bearing area; and
wherein the Crew Rest Compartment is substantially supported by the lip portion and the substantially vertical bearing area.

2. The aircraft of claim 1,
wherein the system box is attached to the aircraft in a crown area of the aircraft, and
wherein the Crew Rest Compartment is attached to the crown area of the aircraft by being attached to the system box.

3. The aircraft of claim 1,
wherein the plurality of aircraft systems comprises one or more systems selected from the group consisting of oxygen supply, air conditioning supply, electrical supply, lighting supply, water supply and waste water supply.

4. The aircraft of claim 1,
wherein the system box comprises a segment wall such that the system box further comprises a second segment, and
wherein the plurality of aircraft systems is accommodated in the first segment and the second segment.

5. The aircraft of claim 4,
wherein the first and second segments electrically shielded from each other.

6. The aircraft of claim 1,
wherein the plurality of aircraft systems is accommodated in the first segment between aircraft fuselage wall and the Crew Rest Compartment.

7. The aircraft of claim 1,
wherein the system box comprises one component.

8. The aircraft of claim 1,
wherein the system box comprises at least one connecting element configured to interconnect several system boxes.

9. The aircraft of claim 1, wherein the system box is configured to establish substantially lateral mechanical contact with the Crew Rest Compartment such that substantially entire weight of the Crew Rest Compartment is transmitted to the aircraft structure via the system box.

10. A modular kit for an aircraft comprising:
first and second system boxes configured to be connected to each other along a longitudinal direction of the aircraft and to the aircraft;
wherein said first and second system boxes are configured to accommodate a plurality of aircraft systems,
wherein said first and second system boxes are configured to be connected, along at least a first and a second vertical surface thereof, respectively, to a Crew Rest Compartment, thereby connecting the Crew Rest Compartment to the aircraft,
wherein each of the first and second system boxes comprises an outwardly extending first and second lip portions, respectively, each of first and second lip portions defining a substantially narrow and substantially horizontal bearing area,
wherein each of the first and second system boxes further comprises first and second substantially large and substantially vertical bearing areas, respectively, and
wherein the Crew Rest Compartment is substantially supported by the first and second lip portions and the first and second substantially vertical bearing areas.

11. A system box for accommodating a plurality of aircraft systems and for attaching a Crew Rest Compartment to an aircraft, wherein the system box comprises:
at least a first segment configured to accommodate the plurality of aircraft systems;
an outwardly extending lip portion defining a substantially narrow and substantially horizontal bearing area;
a substantially large and substantially vertical bearing area; and
wherein the lip portion and substantially vertical bearing area are configured to substantially support the Crew Rest Compartment.

* * * * *

UNITED STATES PATENT AND TRADEMARK OFFICE
CERTIFICATE OF CORRECTION

PATENT NO. : 8,382,034 B2  
APPLICATION NO. : 12/317213  
DATED : February 26, 2013  
INVENTOR(S) : Gijsbertus Beentjes, Holger Warner and Christian Wesselink Page 1 of 1

It is certified that error appears in the above-identified patent and that said Letters Patent is hereby corrected as shown below:

On the Title page of the patent item (57) in the fifth line beneath Abstract, insert -- for -- between the words "adapted" and "attachment".

In the Claims

Column 9, line 48, after "segments" insert -- are --.
Column 10, line 3, after "between" insert -- an --.
Column 10, line 45, after "and" insert -- the --.

Signed and Sealed this
First Day of September, 2015

Michelle K. Lee
*Director of the United States Patent and Trademark Office*